(12) United States Patent
Shulman-Peleg et al.

(10) Patent No.: US 11,652,852 B2
(45) Date of Patent: *May 16, 2023

(54) INTRUSION DETECTION AND MITIGATION IN DATA PROCESSING

(71) Applicant: International Business Machines Corporation, Armonk, NY (US)

(72) Inventors: Alexandra Shulman-Peleg, Givataim (IL); Shmuel Regev, Tel Aviv (IL); Ron Peleg, Kfar Bilu (IL); Shahar Kohanim, Rehovot (IL); Zohar Basil, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/115,974

(22) Filed: Dec. 9, 2020

(65) Prior Publication Data

US 2021/0120045 A1    Apr. 22, 2021

Related U.S. Application Data

(63) Continuation of application No. 16/675,317, filed on Nov. 6, 2019, which is a continuation of application
(Continued)

(51) Int. Cl.
*H04L 29/00* (2006.01)
*H04L 9/40* (2022.01)
(Continued)

(52) U.S. Cl.
CPC ............ *H04L 63/205* (2013.01); *G06F 21/53* (2013.01); *G06F 21/554* (2013.01);
(Continued)

(58) Field of Classification Search
CPC .............. H04L 63/205; H04L 63/1416; H04L 63/1441; G06F 21/53; G06F 21/554; G06F 2221/034
See application file for complete search history.

(56) References Cited

U.S. PATENT DOCUMENTS 5,621,889 A * 4/1997 Lermuzeaux ........... G06F 21/55
714/26
6,530,024 B1    3/2003 Proctor
(Continued)

FOREIGN PATENT DOCUMENTS

CN          1768518 A     5/2006
CN        101079779 A    11/2007
(Continued)

OTHER PUBLICATIONS

Barlev et al.,"Secure Yet Usable—Protecting Servers and Linux Containers", Jul. 27, 2016, IBM Journal of Research and Development, vol. 60, Issue 4. 17 pages. Grace Period Disclosure under 35 USC 102(b)(1)(A).
(Continued)

*Primary Examiner* — Jeffrey C Pwu
*Assistant Examiner* — Helai Salehi
(74) *Attorney, Agent, or Firm* — Stosch Sabo

(57) ABSTRACT

A security manager configured to generate a plurality of learned security policies and provide at least one learned security policy and a security agent to a client machine for enforcement of the at least one learned security policy by the security agent on the client machine. The security manager configured to receive alerts from the security agent indicating anomalous behavior on the client machine.

25 Claims, 10 Drawing Sheets

Related U.S. Application Data

No. 15/660,016, filed on Jul. 26, 2017, now Pat. No. 10,560,487.

(51) Int. Cl.
  *G06F 21/53* (2013.01)
  *G06F 21/55* (2013.01)

(52) U.S. Cl.
  CPC ...... *H04L 63/1416* (2013.01); *H04L 63/1441* (2013.01); *G06F 2221/034* (2013.01)

(56) References Cited

U.S. PATENT DOCUMENTS

| | | | |
|---|---|---|---|
| 7,134,141 | B2 | 11/2006 | Crosbie et al. |
| 7,328,259 | B2 | 2/2008 | Srinivasan et al. |
| 7,647,622 | B1 | 1/2010 | Sobel et al. |
| 7,779,113 | B1 | 8/2010 | Samar |
| 7,779,119 | B2 | 8/2010 | Ginter et al. |
| 8,286,243 | B2 | 10/2012 | Clark |
| 9,792,562 | B1 * | 10/2017 | Chen .................. G06N 7/01 |
| 10,560,487 | B2 | 2/2020 | Shulman-Peleg et al. |
| 2004/0015719 | A1 | 1/2004 | Lee et al. |
| 2004/0024864 | A1 | 2/2004 | Porras et al. |
| 2005/0049985 | A1 | 3/2005 | Mangasarian et al. |
| 2007/0107052 | A1 * | 5/2007 | Cangini ............... G06F 21/554 726/22 |
| 2016/0156642 | A1 | 6/2016 | Kouznetsov |
| 2017/0208080 | A1 | 7/2017 | Sakamoto |
| 2019/0036978 | A1 | 1/2019 | Shulman-Peleg et al. |
| 2020/0076861 | A1 | 3/2020 | Shulman-Peleg et al. |

FOREIGN PATENT DOCUMENTS

| | | | |
|---|---|---|---|
| CN | 105307175 | A | 2/2016 |
| CN | 106790256 | A | 5/2017 |
| CN | 110915182 | A | 3/2020 |
| DE | 112018003006 | T5 | 3/2020 |
| GB | 2412540 | A | 8/2005 |
| GB | 2579309 | B | 11/2020 |
| JP | 2004094401 | A | 3/2004 |
| JP | 2015517702 | A | 6/2015 |
| JP | 2015212979 | A | 11/2015 |
| JP | 2017126283 | A | 7/2017 |
| WO | 2012135192 | A2 | 10/2012 |
| WO | 2013169410 | A1 | 11/2013 |
| WO | 2019021180 | A1 | 1/2019 |

OTHER PUBLICATIONS

Chari et al., "BlueBoX: A Policy-Driven, Host-Based Intrusion Detection System", ACM Transactions of Information System and Security, vol. 6, No. 2, May 2003. 28 pages.

Debar et al., "Towards a taxonomy of intrusion-detection systems", Computer Networks 31 (1999). 18 pages.

Garfinkel et al., "A Virtual Machine Introspection Based Architecture for Intrusion Detection", NDSS, vol. 3, 2003. 16 pages.

Vieira et al., "Intrusion Detection for Grid and Cloud Computing", IT Professional Magazine 12.4 (2010): 38. 16 pages.

Yeung et al., "Host-Based Intrusion Detection Using Dynamic and Static Behavioral Models", Pattern recognition 36. 1 (2003). http://www.sciencedirect.com/science/article/pii/S0031320302000262, 5 pages.

Mell et al., "The NIST Definition of Cloud Computing", Recommendations of the National Institute of Standards and Technology, Special Publication 800-145, Sep. 2011. 7 pages.

Loukides, "What is DevOPs?" O'Reilly Media, Jun. 2012. 3 pages. http://shop.oreilly.com/product/0636920026822.do.

Smith, "Hype Cycle for Cloud Computing, 2013", Gartner, Jul. 2013. 2 pages. https://www.gartner.com/doc/2573318/hype-cycle-cloud-computing-.

Heiser, "Hype Cycle for Cloud Security, 2013", Gartner, Jul. 2013. 2 pages. https://www.gartner.com/doc/2570118/hype-cycle-cloud-security-.

Forrest et al., "The Evolution of System-call Monitoring", In Computer Security Applications Conference, 2008. ACSAC 2008. 13 pages.

Gao et al., "Behavioral Distance Measurement Using Hidden Markov Models", Carnegie Institute of Technology, department of Electrical and Computer Engineering, RAID 2006, LNCS 4219. 23 pages.

Endler, "Intrusion Detection Applying Machine Learning to Solaris Audit Data", Proceedings of the 14th Annual Computer Security Applications Conference, 1998. 12 pages.

Ghosh et al., "Learning Program Behavior Profiles for Intrusion Detection", Proceedings of the Workshop on Intrusion Detection and Network Monitoring, Santa Clara, CA. Apr. 9-12, 1999. 13 pages.

Liao et al., "Using K-Nearest Neighbor Classifier for Intrusion Detection", Computers & Security, Oct. 2002. 11 pages.

Kruegel et al., "Bayesian Event Classification for Intrusion Detection", Proceedings of the 19th Annual Computer Society Applications Conference (ACSAC 2003). 10 pages.

Sacks, "Pro Website Development and Operations", eBook, Chapter 6—Production Launches, 2012. 9 pages. http://www.springer.com/gp/book/9781430239697.

Buecker et al., "IBM Security Solutions Architecture for Network, Server and Endpoint", IBM Redbooks. Feb. 2011 Chapter 1-7, 264 pages.

Buecker et al., "IBM Security Solutions Architecture for Network, Server and Endpoint", IBM Redbooks. Feb. 2011. Chapter 8-13, 246 pages.

Mattetti et al., "Automatic security hardening and protection of linux containers", ResearchGate, Conference Paper. Sep. 2015. 15 pages.

Warrender et al., "Detecting Intrusions Using System Calls: Alternative Data Models", Security and Privacy, 1999. Proceedings of the 1999 IEEE Symposium. 13 pages.

Notification of Transmittal of the International Search Report and the Written Opinion of the International Searching Authority, or the Declaration, International Application No. PCT/IB2018/055503, dated Nov. 28, 2018, 9 pages.

Shulman-Peleg et al., "Intrustion Detection and Mitigation in Data Processing", Application No. 2020-502351, Filed Jul. 24, 2018.

IBM, List of IBM Patents or Patent Applications Treated as Related, Dec. 8, 2020, 2 pages.

* cited by examiner

INTRUSION DETECTION AND MITIGATION IN DATA PROCESSING

STATEMENT REGARDING PRIOR DISCLOSURES BY THE INVENTOR OR A JOINT INVENTOR

The following disclosure(s) are submitted under 35 U.S.C. 102(b)(1)(A):

"Secure Yet Usable—Protecting Servers and Linux Containers", S. Barley, Z. Basil, S. Kohanim, R. Peleg, S. Regev, A. Shulman-Peleg, 27 Jul. 2016, IBM Journal of Research and Development, Vol. 60, Issue 4, pgs. 12:1-12:10.

BACKGROUND

The present disclosure relates to computer security, and, more specifically, to intrusion detection systems.

Computer security systems preserve confidentiality of data (e.g., protecting against a privacy breach), integrity of data (e.g., protecting against data corruption), and availability of data (e.g., protecting against disrupted functionality) stored in, executed on, and/or communicated between computer systems. Nonetheless, unauthorized intrusions into computer systems can result in compromised data and/or limited functionality.

Unauthorized intrusions can utilize a variety of attack vectors such as, but not limited to, workstation infestation, credential theft, exploitation (e.g., buffer overflows, stack overruns, etc.), vulnerabilities (e.g., exploiting coding weaknesses of applications, kernels, etc.), and escape-to-host attacks.

SUMMARY

Aspects of the present disclosure are directed to a computer-implemented method comprising intercepting, by a security agent of a client machine, a first subset of a plurality of events generated by a first execution environment utilizing the client machine. The first subset of the plurality of events can be intercepted according to a first learned security policy. The first learned security policy can be learned based on observing operation of the first execution environment. The first subset can comprise less than half of the plurality of events, and at least one event of the first subset of events can be a type of event associated with a malicious code profile. The computer-implemented method can further comprise identifying, by the security agent and based on the first learned security policy for the first execution environment, an anomaly based on comparing at least one intercepted event to at least one rule of the first learned security policy. The computer-implemented method can further comprise executing, by the security agent, a mitigation action responsive to identifying the anomaly.

Further aspects of the present disclosure are directed toward a computer system comprising a processor, and a tangible, computer-readable memory for storing program instructions which, when executed by the processor, perform the steps of intercepting a first subset of a plurality of events generated by a first execution environment utilizing a client machine. The first subset of the plurality of events can be defined by a first learned security policy. The first learned security policy can be learned based on observing operation of the first execution environment. The first subset can comprise less than half of the plurality of events, and at least one event of the first subset of events can be a type of event associated with a malicious code profile. The program instructions can be executed by the processor to further perform the steps of identifying, based on the first learned security policy for the first execution environment, an anomaly based on comparing at least one intercepted event to at least one rule of the first learned security policy and executing a mitigation action responsive to identifying the anomaly.

Further aspects of the present disclosure are directed toward a computer program product comprising a computer readable storage medium having program instructions embodied therewith. The computer readable storage medium may not be transitory signal per se. The program instructions executable by a processor to cause the processor to perform a method comprising intercepting a first subset of a plurality of events generated by a first execution environment utilizing a client machine. The first subset of the plurality of events can be defined by a first learned security policy. The first learned security policy can be learned based on observing operation of the first execution environment. The first subset can comprise less than half of the plurality of events, and at least one event of the first subset of events is a type of event associated with a malicious code profile. The processor can perform a method further comprising identifying, based on the first learned security policy for the first execution environment, an anomaly based on comparing at least one intercepted event to at least one rule of the first learned security policy and executing a mitigation action responsive to identifying the anomaly.

Further aspects of the present disclosure are directed toward a system comprising a security manager comprising a processor, a memory storing processor-executable instructions, a security policy database, and an interface. The security manager can be communicatively coupled to a plurality of nodes. The security manager can be configured to generate a plurality of security policies including a first learned security policy based on a minority of events associated with a synthetic first execution environment. At least one rule associated with the first learned security policy can be based on a type of event that is associated with a malicious code profile. The security manager can be further configured to store the plurality of security policies in the security policy database and provide a respective security agent and at least the first learned security policy to a subset of the plurality of nodes. The subset of nodes can be configured to host the first execution environment. Respective security agents can be configured to enforce at least the first learned security policy on respective nodes of the subset of nodes. The security manager can be further configured to receive, from a first security agent provided to a first node, an alert identifying an anomaly based on at least one intercepted event generated by the first execution environment utilizing the first node and intercepted by the first security agent according to the first learned security policy.

Further aspects of the present disclosure are directed toward a computer-implemented method comprising generating a plurality of security policies including a first learned security policy based on a subset of events associated with a synthetic first execution environment, where at least one rule associated with the first learned security policy is based on a type of event that is associated with a malicious code profile. The method can further comprise storing the plurality of security policies in a security policy database and providing at least the first learned security policy to a plurality of clients. The first learned security policy can be relevant to a first execution environment deployed by the plurality of clients. The plurality of clients can be configured to enforce the first learned security policy. The method can further comprise receiving, from a first client, an alert identifying an anomaly based on at least one intercepted event generated by the first execution environment deployed on the first client and intercepted by the first client according to the first learned security policy.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
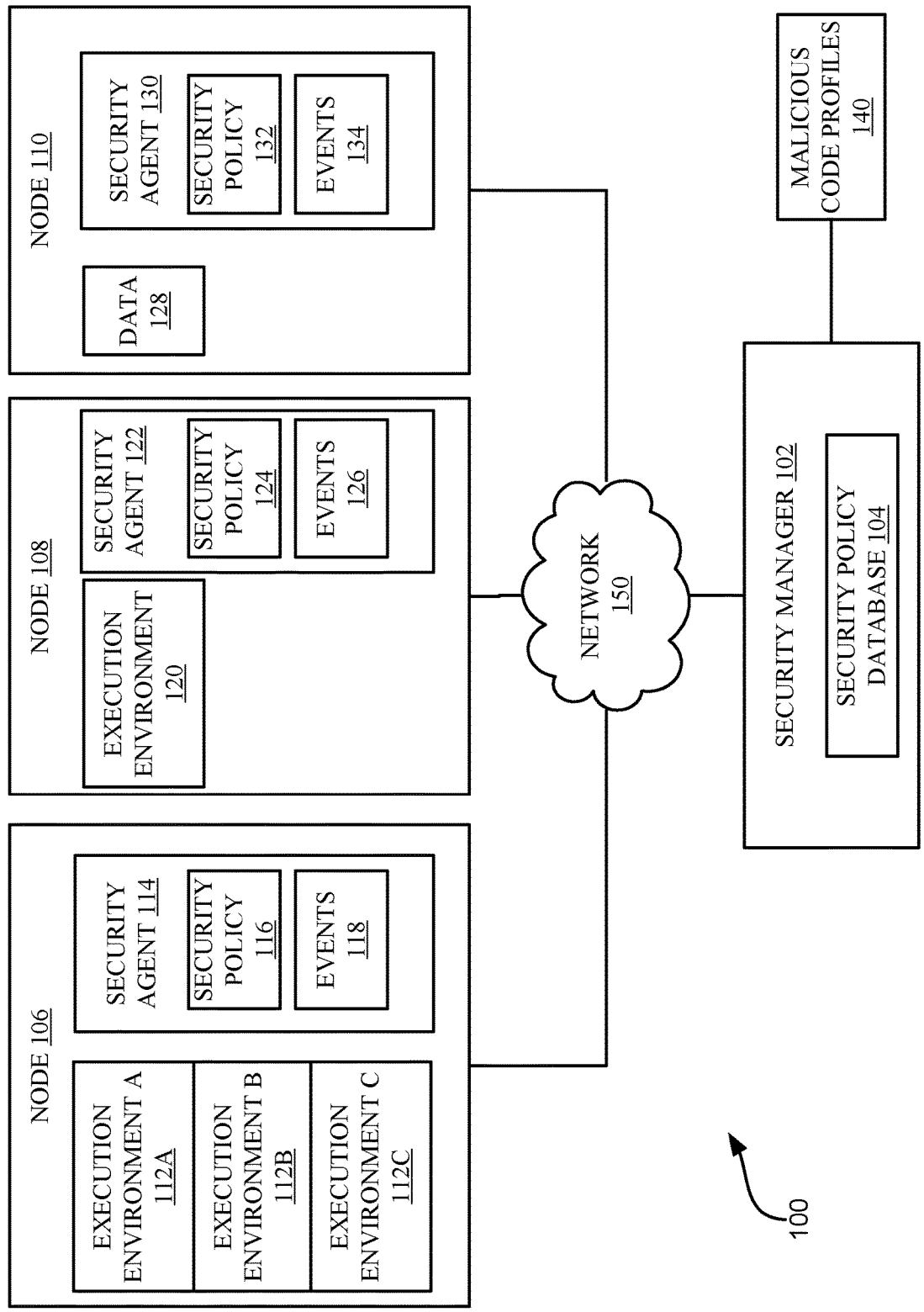
FIG. 1 illustrates a block diagram of an example security environment in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward computer security, and, more specifically, toward intrusion detection systems. Aspects of the present disclosure develop one or more security policies based on selectively intercepted events generated in a controlled (e.g., training, synthetic, simulated, or pre-production) execution environment. Each security policy can comprise one or more rules. Each rule can comprise a set of conditions. A client machine can use one or more security policies. In some embodiments, client machines are servers in a production environment. Relationships between rules, security policies, and client machines can be described by many-to-many relationships stored in a security policy database. The generated security policy can be enforced in an execution environment running on one or more client machines. The security policy can be enforced by intercepting specific types of events associated with the execution environment and comparing the intercepted events to relevant rules and conditions stored in the security policy. The intrusion detection system can generate alerts, and, in some cases, mitigate intrusions based on comparing the selected types of events to the security policy.

For the purposes of the present disclosure, an execution environment can comprise software routines associated with various classes of processes. Execution environments can be, but are not limited to, applications, containers, virtual machines (VMs), database management systems (DBMS), logical partitions (LPARS), and execution entities. Execution environments can have various levels of granularity according to various embodiments of the present disclosure. For example, an execution environment can be defined for each type of application that can execute on a device. Alternatively, one execution environment can be defined for multiple applications belonging to a same or similar class of applications. Thus, the scope of execution environments can be tailored to manage factors such as the complexity and manageability of a security policy database and the computational overhead associated with executing respective security policies.

For example, an execution environment defined for multiple applications can result in fewer security policies stored in a security policy database (because each security policy covers a greater number of applications) while also resulting in a higher computational overhead during operation (because executing each security policy requires enforcing a larger number of rules, where only a subset of the rules may be applicable to the given application).

Alternatively, an execution environment defined for each application can result in a more complicated security policy database (because of the larger number of security policies) but in reduced computational overhead associated with executing security policies associated with each execution environment (because each security policy contains only the rules relevant to the given application).

For the purposes of the present disclosure, an event can be defined as a communication generated by, or associated with, an execution environment. Events can be, but are not limited to, system calls, operations, commands, processes, tasks, or other events which can be intercepted from logfiles such as a system logfile (syslog), an operations logfile (operlog), an event logfile, a transaction logfile, or a message logfile. In some embodiments, events can be intercepted from network traffic. In various embodiments, events can be intercepted during transmission of the event, approximately contemporaneously with storing the event (e.g., in a logfile), or subsequent to storing the event (e.g., retrieving historical data from a logfile). As used hereinafter, a type of event refers to a class of event (e.g., a file system mounting process, a file access, etc.) whereas an event refers to the actual execution of a type of event where the event can contain parameters associated with a particular execution environment.

Traditional intrusion detection systems can suffer from numerous challenges such as generating an excessive number of alerts, requiring significant expertise (e.g., to configure/maintain the intrusion detection system, and to interpret outputs from the intrusion detection system), and having rules which are too rigid (e.g., not allowing authorized updates to occur) or rules which are too flexible (e.g., failing to identify new malicious attack profiles).

Some example protection systems are anti-virus tools, rootkit detectors, and/or advanced persistent threat (APT) tools configured to prevent infection of a machine, or, with respect to an already infected machine, to neutralize the existing threat. Disadvantageously, these tools place a significant resource burden (e.g., runtime overhead) on the machines using them. For example, these tools may require examination of every incoming network communication.

Another example protection system is execution policy configuration, whereby a user defines expected behavior of a computer system in order to prevent anything else (e.g., malicious code) from being executed. Disadvantageously, execution policies can be too rigid. For example, operating system updates and/or manual administration sessions may not be practical while an execution policy is in use.

Another example protection system is whitelisting, whereby files with unknown or malicious content are prevented from executing. However, whitelisting may fail to prevent attacks using reputable tools (e.g., nmap or tcpdump) which are commonly used in safe execution environments.

Another example protection system is a network-based intrusion detection system (NIDS). Disadvantageously, numerous attacks are difficult or impossible to detect at the network level.

Another example protection system is a host-based intrusion detection system (HIDS) that monitors the behavior of applications on the host by examining interactions with the underlying operating system. However, traditional HIDS are unable to monitor the large number of calls made in network environments where hundreds of different containers and/or virtual machines may be executed.

Aspects of the present disclosure are directed to a modified HIDS protection solution. The modified HIDS protection solution provides a variety of advantages over traditional protection systems.

One example advantage of aspects of the present disclosure is low computational overhead. Aspects of the present disclosure exhibit low computational overhead by selectively intercepting and evaluating only events most likely to be associated with an intrusion and/or malicious attack. For example, aspects of the present disclosure can intercept, among other events, events associated with new process launching, file system mounting, library loading, critical file accesses, network configuration changes, and other events that would likely be used as part of an unauthorized intrusion and/or malicious attack. Advantageously, this strategy reduces computational overhead by limiting the number of intercepted and evaluated events. According to some embodiments of the present disclosure, the number of intercepted events can be significantly less than the total number of events generated during a given time interval (e.g., less than 10% of total events, and, in some cases, less than 1% of total events).

Another example advantage of aspects of the present disclosure is automatic learning. Contrary to some traditional solutions requiring a security policy to be manually defined prior to implementation, aspects of the present disclosure engage in a learning period in a controlled (e.g., training, synthetic, simulated, or pre-production) environment reproducing typical daily and/or weekly tasks associated with normal operating conditions. Aspects of the present disclosure use these training observations to generate rules defining normal and abnormal behavior.

A further advantage of aspects of the present disclosure is security policy extensibility. For example, a rack of similar servers may utilize a security policy generated during a learning period by any one server of the rack of servers without requiring each server of the rack of servers to undergo a training period. This advantage is readily apparent at scale in situations involving hundreds or thousands of devices.

A further advantage of aspects of the present disclosure are limited learning phases. For example, aspects of the present disclosure may enter a limited learning phase to re-learn changes resulting from an authorized update process (e.g., an operating system update, application update, etc.). In contrast, some traditional security systems would identify an authorized update as an anomaly and prevent the update from occurring. Furthermore, some traditional security systems would require manual reconfiguration of a security policy to account for any changes resulting from an authorized update. Thus, advantageously, aspects of the present disclosure automatically identify an authorized update and allow authorized updates to occur. Furthermore, aspects of the present disclosure advantageously refine the security policy based on changes made during the authorized update to ensure the security policy is appropriately defining normal and abnormal behavior in light of the authorized update.

A further advantage of aspects of the present disclosure is improved security policy management. The security policies are described in a many-to-many model enabling any machine to be associated with multiple security policies (e.g., an operating system security policy, a web-browsing security policy, and a back-up system security policy can be associated with, and enforced on, a single machine), and any security policy to be associated with multiple machines. Likewise, any rule can be associated with multiple security policies, and any security policy can be associated with multiple rules. Thus, an update to any single rule is readily available to every security policy and machine associated with the updated rule.

The aforementioned advantages are example advantages, and not all advantages are listed. Embodiments of the present disclosure exist that contain all, some, or none of the aforementioned advantages while remaining within the spirit and scope of the present disclosure.

Referring now to the figures, FIG. 1 illustrates an example security environment 100 in accordance with some embodiments of the present disclosure. Security environment 100 can include security manager 102 containing security policy database 104 and communicatively coupled to node 106, node 108, and node 110 via network 150. In some embodiments, security environment 100 represents a production environment (e.g., a computer environment running real workloads), while in other embodiments, security environment 100 can represent a controlled environment (e.g., a training environment, a synthetic environment, a simulated environment, or a pre-production environment running test workloads). Although security environment 100 is shown as containing three nodes, embodiments can contain more or fewer nodes. For example, in some embodiments, security manager 102 is communicatively coupled to (or integrated within) a single node. Alternatively, in some embodiments, security manager 102 is communicatively coupled to many nodes (e.g., hundreds, thousands, tens of thousands, or more nodes).

According to various embodiments, nodes 106, 108, and 110 can be devices associated with hardware configured to perform computational functions. Nodes 106, 108, and 110 can be, but are not limited to, servers, computers, laptops, mainframes, or other devices. Nodes 106, 108, and 110 can be similar or dissimilar devices having similar or dissimilar functions and capabilities. In some embodiments, each of nodes 106, 108, and 110 can represent a separate network or sub-network of nodes. In some embodiments, each of nodes 106, 108, and 110 can represent a separate production environment. In some embodiments, security manager 102 communicates with each node 106, 108, and 110, but nodes 106, 108, and 110 may not be able to communicate with each other. In some embodiments, nodes 106, 108, and 110 can also be referred to as clients, client devices, client machines, and/or machines. In some embodiments nodes 106, 108, and 110 represent virtual machines. Although nodes 106, 108, and 110 will occasionally be referred to as "clients" or "client machines" hereinafter, it is to be understood that the machines are only "clients" with respect to the security system, and they can act as servers with respect to other machines in the network.

According to various embodiments, network 150 can be a physical network, a virtual network, or a network comprising both physical connections between some devices and virtual connections between other devices. In various embodiments, the network 150 is a public network, a private network, or a network having both public and private characteristics.

In some embodiments, security manager 102 comprises one or more devices (e.g., a node, a workstation, a laptop, a set of servers coupled to an interface, or a virtual machine running on one or more devices). In some embodiments, security manager 102 comprises computer-executable instructions downloadable from a tangible storage device via a network and configured to execute on the device to which it is downloaded. Security manager 102 is described in further detail hereinafter with respect to FIGS. 4-8.

Security manager 102 contains security policy database 104. Although security policy database 104 is shown as integrated within security manager 102, security policy database can alternatively be distant from security manager 102 and communicatively coupled to security manager 102 via a physical or virtual connection.

Security policy database 104 can store security policies for various execution environments. Security policy database 104 can store security policies defined by many-to-many relationships between rules, policies, and machines. In some embodiments, the many-to-many relationships can be defined by numerous tables in the security policy database 104. In some embodiments, security policies are stored as keyed hash lists (e.g., using execution environment attributes as a key). In some embodiments, security policies are stored as directed acyclic graphs (DAG) having security policies as nodes and having relationships between security policies as edges connecting the nodes. In some embodiments, security policies stored in security policy database 104 include static rules and dynamic rules. Static rules can be independent of execution environment parameters, whereas dynamic rules can be dependent on execution environment parameters. Thus, one or more parameters of a given execution environment can be substituted into one or more dynamic rules prior to enforcing the security policy in the selected execution environment. In some embodiments, security policies stored in security policy database 104 are learned security policies based on observations in a simulated execution environment. In some embodiments, the security policies stored in security policy database 104 are updated by limited re-learning periods upon identification of an authorized update (e.g, operating system update, software update, etc.) relevant to the security policy. Security policy database 104 is described in more detail hereinafter with respect to FIGS. 2-3 and 5.

In some embodiments, security manager 102 is communicatively coupled to malicious code profiles 140. Malicious code profiles 140 can comprise a public or private database of malicious attack and/or unauthorized intrusion profiles. For the purposes of the present disclosure, malicious attack profiles and unauthorized intrusion profiles are synonymous insofar as they are both directed to unauthorized access to a device and/or network regardless of whether or not the unauthorized access results in detectable damage. For respective attacks/intrusions, malicious code profiles 140 can discuss techniques, outputs, countermeasures, code, system calls, processes, tasks, commands, and/or other attributes that may be useful to generating security policies stored in security policy database 104.

Security manager 102 can provide security agent 114 to node 106. In some embodiments, security agent 114 comprises processor executable instructions downloadable to node 106 and executable on node 106 using existing hardware resource associated with node 106. Security agent 114 can include security policy 116 and events 118. Security policy 116 can be one or more security policies from security policy database 104 and relevant to node 106 based on execution environments that occur on, or can occur on, node 106. Events 118 comprise an intercepted subset of events generated by various execution environments (e.g., execution environments A-C 112A-112C) running on node 106 and intercepted by security agent 114 for evaluation using security policy 116.

Events 118 can comprise events generated by various execution environments. For example, events 118 can be system calls and/or aspects of executable code. Events 118 can be intercepted from, for example, logfiles. Events 118 can comprise fewer events than a total number of events generated by the execution environment. In some embodiments, security agent 114 can intercept events 118 based on the events 118 having a higher degree of association with malicious attacks than other events generated by the execution environment that are not intercepted. In some embodiments, events 118 can contain events such that each event, or a majority of the events, appears in at least one, a majority, or more than 25%, 50%, 75%, or 90% of catalogued malicious attack profiles. In some embodiments, events 118 contain events that have a higher rate of appearance in catalogued malicious attack profiles than an average rate of appearance of all events generated by a given execution environment. In some embodiments, events 118 comprise a minority (e.g., less than 50%, less than half), less than 10%, or less than 1% of the total number of events generated by the execution environment over a time interval (e.g., 1 hour, 1 day, etc.).

Node 106 can host execution environments A-C 112A-112C. Execution environments A-C 112A-112C can be similar or dissimilar execution environments utilizing aspects of node 106. In various embodiments, respective nodes can host more or fewer execution environments than the three execution environments A-C 112A-112C shown on node 106.

Security manager 102 is further connected to node 108. Node 108 can host execution environment 120 which can be similar or dissimilar to execution environments A-C 112A-112C shown on node 106. Node 108 can further include security agent 122 storing security policy 124 and events 126. Although security agent 122 can be consistent with security agent 114 (e.g., both provided to respective nodes by security manager 102), security agent 122 can enforce one or more security policies 124 which may be similar or different from security policies 116 enforced by security agent 114. Likewise, security agent 122 can intercept events 126 generated by execution environment 120 which may be similar or different to the events 118 intercepted from execution environments A-C 112A-112C.

Security manager 102 is further shown connected to node 110. Node 110 can host data 128 such as, for example, a file system. Node 110 can further include security agent 130 storing security policy 132 and events 134. Although security agent 130 can be consistent with security agent 122 and security agent 114, security agent 130 can implement one or more similar or different security policies 132 than security policies 124 and 116, and security agent 130 can intercept events 134 that can be similar or different than events 126 and 118. For example, security agent 130 can function as a file integrity monitoring (FIM) system and can intercept events 134 associated with file accesses and/or modifications to selected files stored in data 128.

Figure 2:
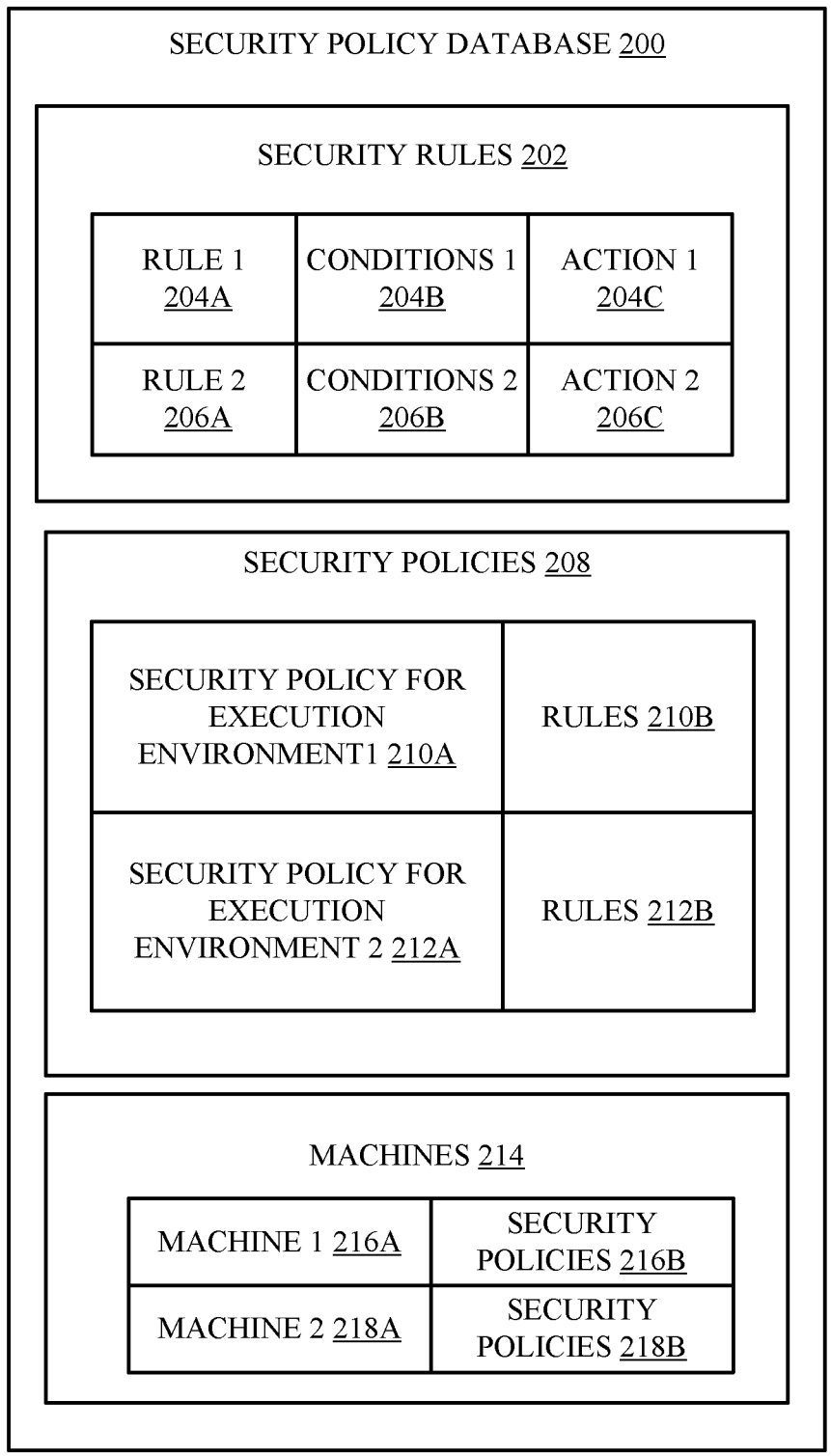
FIG. 2 illustrates an example security policy database in accordance with some embodiments of the present disclosure.

FIG. 2 illustrates an example security policy database 200 according to some embodiments of the present disclosure. In some embodiments, security policy database 200 is consistent with security policy database 104 of FIG. 1. Security policy database 200 can comprise security rules table 202, security policies table 208, and machines table 214. As will be appreciated by one skilled in the art, the tables illustrated in security policy database 200 are illustrated as an example topology of a security policy database 200 and in practice, more or fewer tables may exist, having more or fewer columns and rows, and interrelated by one or more mapping tables (not shown).

Security rules 202 stores for each rule, such as rule 1 204A, one or more conditions, such as conditions 1 204B, and one or more actions, such as action 1 204C. Rule 1 204A can identify a rule (e.g., by a numeric, alphanumeric, lexical, or other identification).

Conditions 1 204B can define one or more conditions related to one or more events (e.g., processes, system calls, etc.). Conditions 1 204B can be associated with, but not limited to, a process name, a command line, and/or a file digest of one or more events.

Action 1 204C can be one or more actions associated with outcomes of the conditions 1 204B. For example, action 1 204C continues monitoring (e.g., by iterating a next event) based on the conditions 1 204B indicating the event is normal. In another example, action 1 204C issues an alert based on conditions 1 204B indicating the event is abnormal. In another example, action 1 204C mitigates, responsive to conditions 1 204B indicating an abnormality, the abnormality by, for example, terminating one or more processes associated with the abnormality. In some embodiments, more than one action occurs simultaneously or sequentially. For example, in some embodiments, action 1 204C comprises simultaneously issuing an alert and terminating an abnormality. In some embodiments, action 1 204C comprises issuing an alert, and, responsive to input provided by a security manager, terminating the abnormality. In some embodiments, action 1 204C comprises issuing an alert, and, responsive to a period of time passed or detection of a second abnormal event, automatically terminating the abnormality.

Conditions 1 204B can be restrictive or permissive. For example, conditions 1 204B can include permissive conditionals which, if determined to be true, result in a determination that an intercepted event is an abnormality, otherwise (i.e., if determined to be false) the intercepted event is determined to be a normal event. Thus, in such embodiments, only events matching a specific profile are identified as anomalous.

Conversely, conditions 1 204B can include restrictive conditionals which, if determined to be true, result in a determination that an intercepted event is a normal event, otherwise (i.e., if determined to be false) the intercepted event is determined to be an abnormality. Thus, in such embodiments, any event failing to match a specific profile is considered anomalous.

Permissive conditionals can be beneficial for diverse workloads (e.g., to limit false positives such as identifying a normal event as an abnormal event), whereas restrictive conditionals can be beneficial for predictable workloads (e.g., to limit false negatives such as identifying an abnormal event as a normal event). In some embodiments, both permissive conditionals and restrictive conditionals are used.

Security rules 202 further comprises rule 2 206A with corresponding conditions 2 206B and actions 2 206C. Although only two rules and corresponding condition(s) and action(s) are shown for purposes of explanation, it is to be understood that security rules table 202 can comprise any suitable number of rules (e.g., thousands). In some embodiments, security rules table 202 can be generated by automated learning in simulated execution environments (described in more detail hereinafter with respect to FIG. 5).

As a non-limiting example of a permissive security rule (e.g., abnormal if true, normal if false), rule 1 204A can be related to intercepted file access functions for selected files. Conditions 1 204B can include determining if, responsive to intercepting an access request to a selected file, the user profile associated with the request has less than an "administrator" role and if the access request is generated during non-working hours (e.g., overnight). If both conditionals are true, rule 1 204A can execute one or more actions 1 204C such as sending an alert to a security manager and/or reducing privileges associated with the user profile generating the access request. If either of the conditions of 1 204B is false, rule 1 204A considers the event a normal event and proceeds with the monitoring.

As an example of a restrictive security rule (e.g., normal if true, abnormal if false), rule 2 206A could be related to file system mounting processes. An event related to mounting a new file system can be intercepted and compared against conditions 2 206B. Conditions 2 206B can determine if the intercepted event contains privilege authorizations (e.g., read and write profiles) identical to a typical file system mounting process identified during learning the security rule. If the intercepted event contains non-identical privilege authorizations, rule 2 206A can execute action 2 206C such as terminating the file system mounting process and providing an alert to a security manage. If the intercepted event contains identical privilege authorizations, the intercepted event can be determined to be a normal event.

Security policies table 208 comprises sets of security rules for respective execution environments. For example, security policies table 208 can contain a security policy for execution environment 1 210A containing one or more rules 210B retrieved from security rules table 202. Likewise, security policy for execution environment 2 212A can contain one or more rules 212B retrieved from security rules table 202. Security policies can be narrowly defined (e.g., a security policy for a particular application) or broadly defined (e.g., a security policy for a set of applications). Although two example security policies are shown in security policies table 208, it is to be understood that any suitable number of security policies can be included in security policy table 208. For example, many tens, hundreds, or thousands of security policies are possible based on the granularity of the execution environment definition and the diversity of workloads operating on clients utilizing security policies in security policy table 208. Security policies table 208 can be generated based on training in simulated execution environments (described in more detail hereinafter with respect to FIG. 5).

Machines table 214 can include a listing of one or more machines functioning in a security environment (e.g., security environment 100 of FIG. 1). Machines table 214 associates particular machines, nodes, clients, client machines, or other devices to an appropriate set of security policies. In various embodiments, machines table 214 can also be referred to as a nodes table, clients table, or client machines table.

Machines table 214 can include machine 1 216A and one or more security policies 216B associated with machine 1 216A and retrieved from security policies table 208. Machines table 214 can further include machine 2 218A associated with security policies 218B retrieved from security policies table 208. Although only two machines are included in machines table 214 for purposes of illustration, it is to be understood that more or fewer machines can be included in machines table 214. For example, in some embodiments, machines table 214 can include thousands of machines or more. Furthermore, machine 1 216A and machine 2 218A can refer to physical machines or virtual machines in various embodiments.

Association of machines to security policies can be learned by training (e.g., by matching execution profiles or events occurring on a given machine with execution profiles or events stored in rules of a given security policy), or by machine type (e.g., all servers have a first set of security policies, all desktops have a second set of security policies, all laptops have a third set of security policies, etc.), or by manual configuration.

Figure 3:
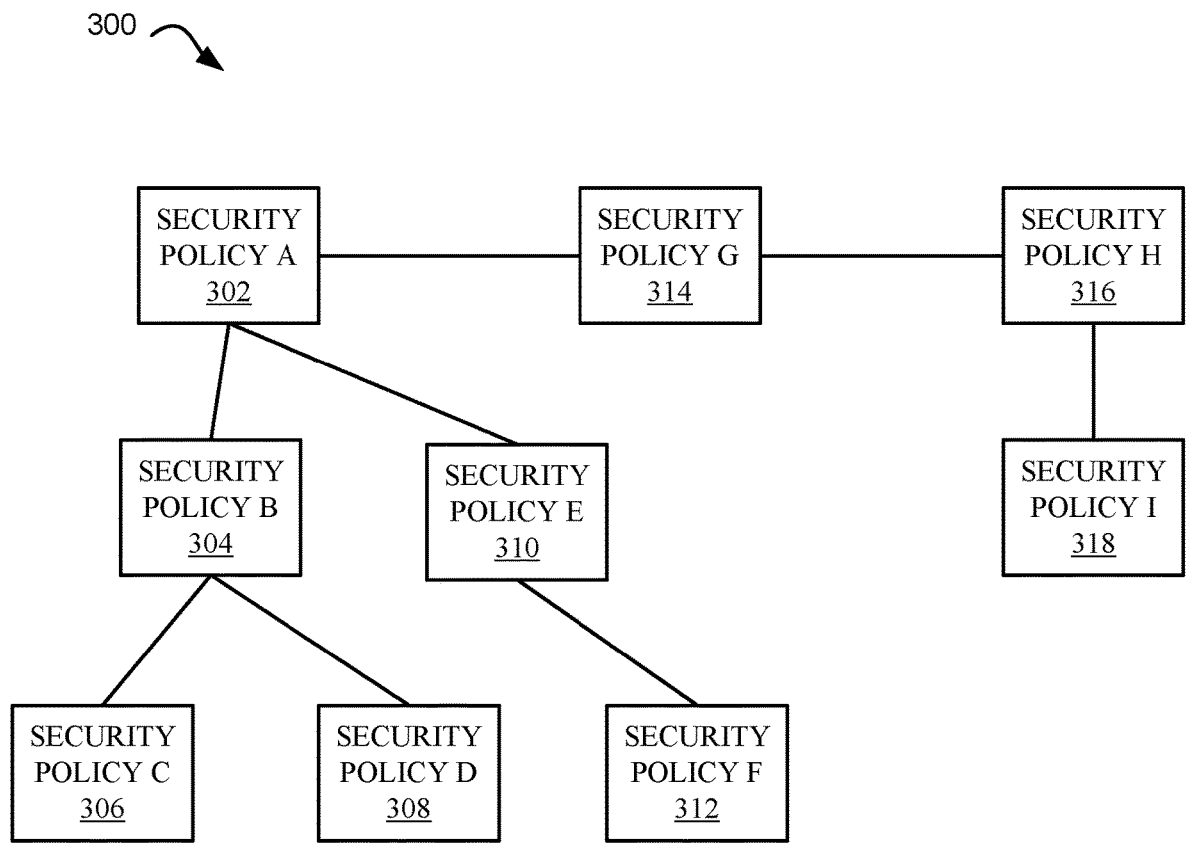
FIG. 3 illustrates an example topology of a directed acyclic graph (DAG) in accordance with some embodiments of the present disclosure.

FIG. 3 illustrates an example topology of a directed acyclic graph in accordance with some embodiments of the present disclosure. Directed acyclic graph (DAG) 300 is an illustration of a strategy for organizing security policies in accordance with some embodiments of the present disclosure. As will be appreciated by one skilled in the art, DAG 300 is a topological illustration, and the dependencies illustrated by the nodes and edges in DAG 300 can be realized by one or more interrelated tables in, for example, a security policy database (e.g., security policy database 104 of FIG. 1. or 200 of FIG. 2) or by reducing the topological illustration to a set of coded, logical statements defining the nodes and edges of DAG 300.

DAG 300 can include security policies A-I 302-318. Security policies can be dependent on, or associated with, one or more other security policies as shown in the DAG 300. For example, security policy I 318 is dependent on, or associated with, security policy H 316. Likewise, security policy F 312 is dependent on, or associated with, both security policy E 310 and security policy A 302. Likewise, security policy C 306 and security policy D 308 are each dependent on, or associated with, security policy B 304 and security policy A 302. Some security policies, such as security policy G 314, are not dependent on any other security policies.

A security policy can depend on, or be associated with, another security policy if the security of a machine enforcing the security policy benefits from also enforcing the other security policy. In the illustration of DAG 300, a security policy below another security policy and connected to the other security policy depends on the other security policy.

As shown in DAG 300, some security policies are laterally connected to one another (e.g., security policy A 302 is laterally connected to security policy G 314). Laterally connected security policies have various meanings in various embodiments. In some embodiments, laterally connected security policies can be associated with dependencies (e.g., security policy G 314 could depend on security policy A 302). In some embodiments, laterally connected security policies are associated with one another but do not depend on one another (e.g., laterally connected security policy A 302, security policy G 314, and security policy H 316 may be associated with a same company but not otherwise related to one another). In some embodiments, there are no lateral connections between security policies (e.g., security policy G 314 can be unconnected to security policy A 302).

A security manager or security agent can retrieve appropriate security policies by identifying aspects of an execution environment. For example, a security agent can identify a first application associated with security policy D 308. The security agent can then request and/or retrieve security policy D 308, and automatically also request and/or retrieve the security policies associated with security policy D 308, namely, security policy B 304 and security policy A 302. In such an example, security policy D 308 can be a security policy for a particular application, security policy B 304 can be a security policy for a particular operating system (OS), and security policy A 302 can be a security policy associated with a particular type of machine (e.g., a laptop, or a particular model of a laptop). Thus, DAG 300 can provide expeditious organization and retrieval of sets of security policies in accordance with some embodiments of the present disclosure.

Figure 4:
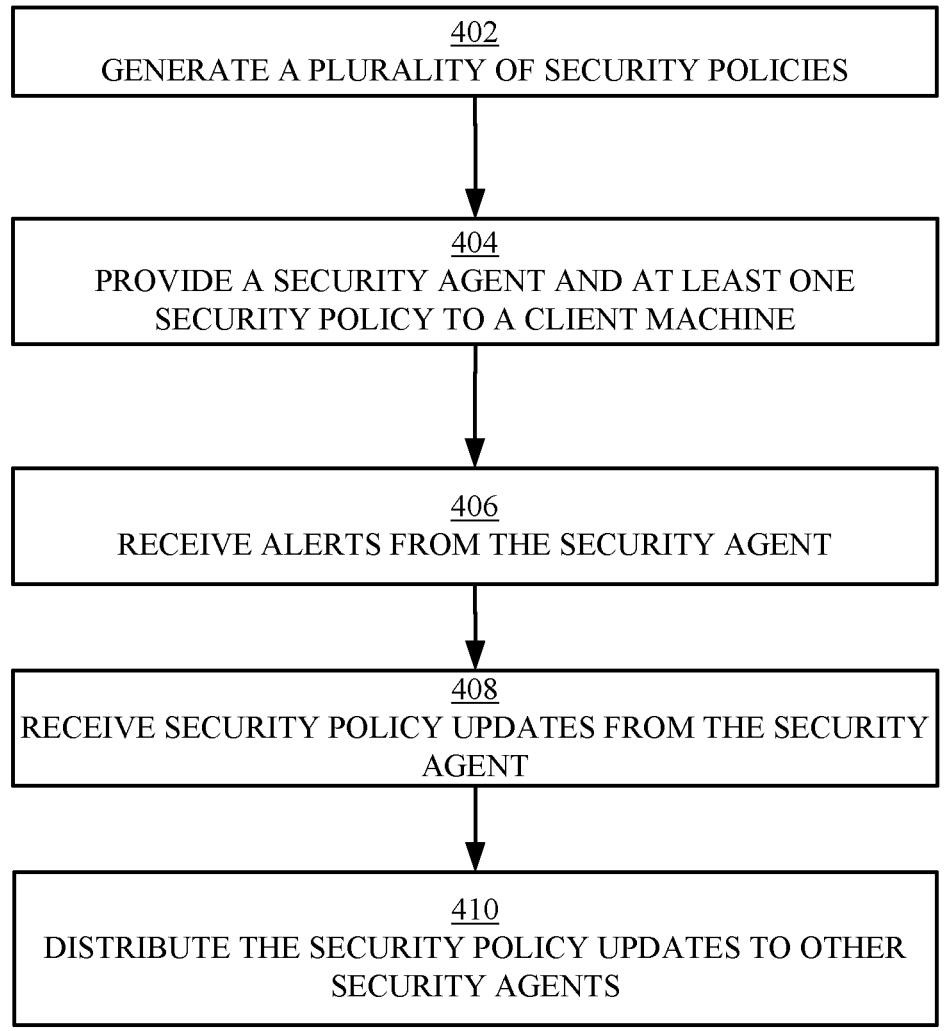
FIG. 4 illustrates a flowchart of an example method for providing security resources to a client machine in accordance with some embodiments of the present disclosure.

FIG. 4 illustrates a flowchart of an example method for providing security resources to a client machine in accordance with some embodiments of the present disclosure. In some embodiments, the method 400 can be implemented by a security manager (e.g., security manager 102 of FIG. 1.). In some embodiments, the method 400 can be performed by executing instructions stored in a computer readable storage medium by a processor communicatively coupled to the computer readable storage medium.

In operation 402, the security manager generates a plurality of security policies. In some embodiments, the plurality of security policies can be generated by observations made in simulated execution environments. In alternative embodiments, the plurality of security policies is generated by observations made in real-time by actual workloads running in production execution environments. Operation 402 is described in further detail hereinafter with respect to FIG. 5.

In operation 404, the security manager provides a security agent (e.g., such as security agent 114 of FIG. 1) together with at least one security policy to a client machine (e.g., a node such as node 106 of FIG. 1). In some embodiments, operation 404 provides the security agent and the at least one security policy to the client machine by downloading instructions for the security agent and at least a subset of the security policy database from the security manager and to the client machine. In some embodiments, the at least one security policy is provided to the client machine based on the client machine hosting, or being configured to host, an execution environment associated with the at least one security policy. In some embodiments, the security agent is first provided to the client machine, and the security agent subsequently requests the at least one security policy from the security manager based on the security agent identifying an execution environment utilizing the client machine. In some embodiments, the security agent queries the security policy database directly using one or more parameters retrieved from the execution environment utilizing the client machine to identify and retrieve an appropriate security policy.

In operation 406, the security manager receives alerts from the security agent hosted on the client machine. The alerts can indicate abnormal behavior or otherwise communicate with the security manager (e.g., to indicate the security agent has been fully configured and is functioning on the client machine, etc.). The alerts can be generated in response to the security agent enforcing a security policy on the client machine as described in further detail hereinafter with respect to FIG. 6.

In operation 408, the security manager receives one or more security policy updates from the security agent implemented on the client machine. The security policy updates can be updated in light of authorized updates related to one or more execution environments associated with the client machine. Security policy updates are described in further detail hereinafter with respect to FIG. 7.

In operation 410, the security manager stores the updated security policy in the security policy database (e.g., security policy database 104 of FIG. 1 or security policy database 200 of FIG. 2), and, in some cases, the method 400 distributes the updated security policy to other security agents running on other client machines.

Figure 5:
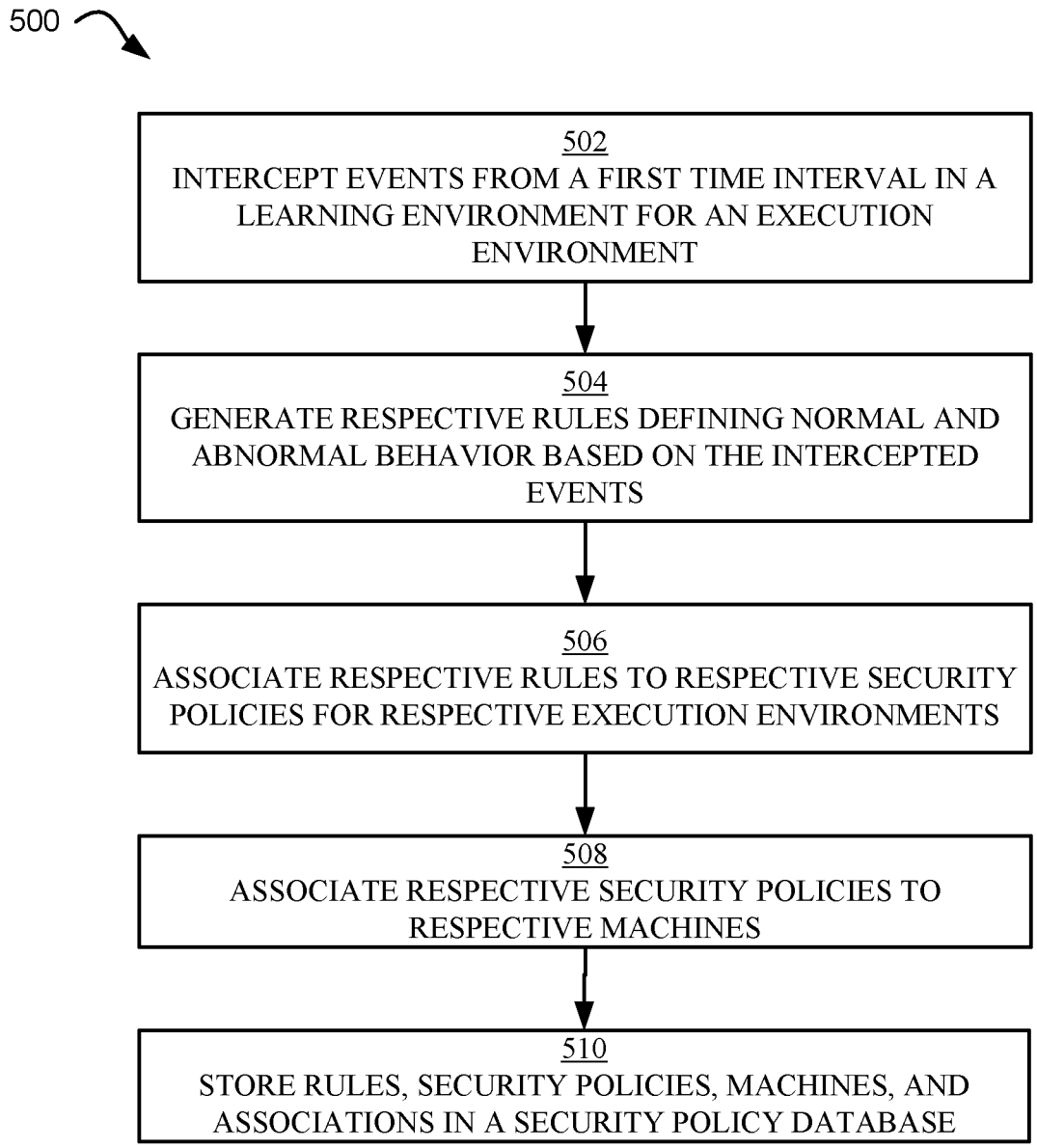
FIG. 5 illustrates a flowchart of an example method for generating a security policy database in accordance with some embodiments of the present disclosure.

FIG. 5 illustrates a flowchart of an example method for generating a security policy database in accordance with some embodiments of the present disclosure. In some embodiments, the method 500 can be executed by a security manager (e.g., security manager 102 of FIG. 1). In some embodiments, the method 500 is performed by executing instructions stored in a computer readable storage medium by a processor communicatively coupled to the computer readable storage medium.

In operation 502, the security manager intercepts a subset of events for a first time interval in a learning environment for one or more execution environments. The subset of intercepted events can be, but are not limited to, types of system calls. For example, the subset of intercepted events can comprise any generated events related to (but not limited to) the following types of events: file system mounting, library loading, network configuration, credential changes, etc. The subset of intercepted events can be retrieved from, for example, logfiles. In some embodiments, the subset of intercepted events comprise less than a total number of generated events in the first time interval (e.g., a minority, less than half, less than 50%, 10%, or 1% of the total number of events generated in the first time interval). In some embodiments, the subset of intercepted events comprise events which exhibit a higher rate of appearance in malicious attack profiles stored in a repository of malicious attack profiles (e.g., malicious code profiles 140 of FIG. 1) compared to an average rate of appearance of all events generated in the first time interval. In some embodiments, the selected events, or a majority of the selected events, comprise events appearing in a threshold percentage (e.g., at least one, a majority, or more than 25%, 50%, 75%, or 90%) of malicious attack profiles. In some embodiments, multiple different conditions are used such that the subset of intercepted events includes an event if it appears in more than 50% of all attack profiles, or if it appears in more than 50% of attack profiles occurring in the previous 1-year interval, or if it occurs in any attack profile associated with a subset of the attack profiles, or if it is manually included based on administrator input. In some embodiments, set theory is used to determine a smallest number of types of events to intercept such that at least one event associated with each malicious attack profile is configured to be intercepted. In various embodiments, the first time interval is less than or equal to 1 hour, 4 hours, 12 hours, 24 hours, 72 hours, or 1 week. The first time interval can be based on types of execution environments, among other factors. In various embodiments, determining the quantity and types of events to intercept is based on manual configuration and/or based on interfacing with a repository of malicious code profiles and identifying respective types of events associated with respective types of malicious code profiles.

In operation 504, the security manager generates respective rules having respective conditions defining normal behavior and abnormal behavior. In some embodiments, operation 504 generates rules consistent with security rules table 202 of FIG. 2, such that each rule is associated with one or more conditions and one or more actions. Operation 504 can generate permissive rules (e.g., if true, anomalous; if false, normal), restrictive rules (e.g., if true, normal; if false, anomalous), or combinations of permissive rules and restrictive rules. In some embodiments, operation 504 interfaces with a repository of malicious attack profiles (e.g., malicious code profiles 140 of FIG. 1) to generate additional conditions for respective rules that may provide additional security.

As a first example, in operation 504 the security manager can generate a plurality of restrictive rules (if true, normal; if false, anomalous) based on each intercepted event of the subset of intercepted events. Thus, in the first example, normal events are only events identical to the events that occurred during learning.

As a second example, in operation 504 the security manager can generate a plurality of permissive rules (if true, anomalous; if false, normal) based on malicious code profiles retrieved from a repository. Thus, in the second example, normal events are any event that does not match a particular malicious code profile.

As a third example, in operation 504 the security manager can generate a plurality of restrictive rules and a plurality of permissive rules. Thus, in the third example, any event matching a given malicious code profile is considered abnormal (according to the permissive rules) and some event types (e.g., a file system mounting process) that fails to match a conditions of the learned event type is considered abnormal (according to the restrictive rules).

In operation 506, the security manager associates respective rules to respective security policies. Multiple security policies can be associated with each rule, and multiple rules can be associated with each security policy. Security policies can comprise rules relevant to a particular execution environment or a particular subset of an execution environment. As a first example, a security policy can store security rules for a specific application, operating system, and machine type. As a second example, a first security policy can store rules relevant to the specific application, a second security policy can store rules relevant to a particular operating system associated with the specific application, and a third security policy can store rules relevant to a type of machine associated with the operating system and/or the specific application. In the case of the second example, in some embodiments, operation 506 generates a directed acyclic graph (e.g., DAG 300 of FIG. 3) storing the hierarchy of security policies.

In operation 508, the security manager associates respective security policies to respective machines. In some embodiments, operation 508 generates a machines table in a security policy database such as machines table 214 of FIG. 2. Multiple security policies can be associated with each machine, and multiple machines can be associated with each security policy. The machines can be various types of hardware resources (e.g., servers, desktops, laptops, mobile phones, etc.), and, in some embodiments, the machines can comprise virtual machines. In some embodiments the machines are referred to as clients or client machines.

In operation 510, the security manager stores the generated rules, policies, and associations in a security policy database such as security policy database 104 of FIG. 1 or security policy database 200 of FIG. 2.

Figure 6:
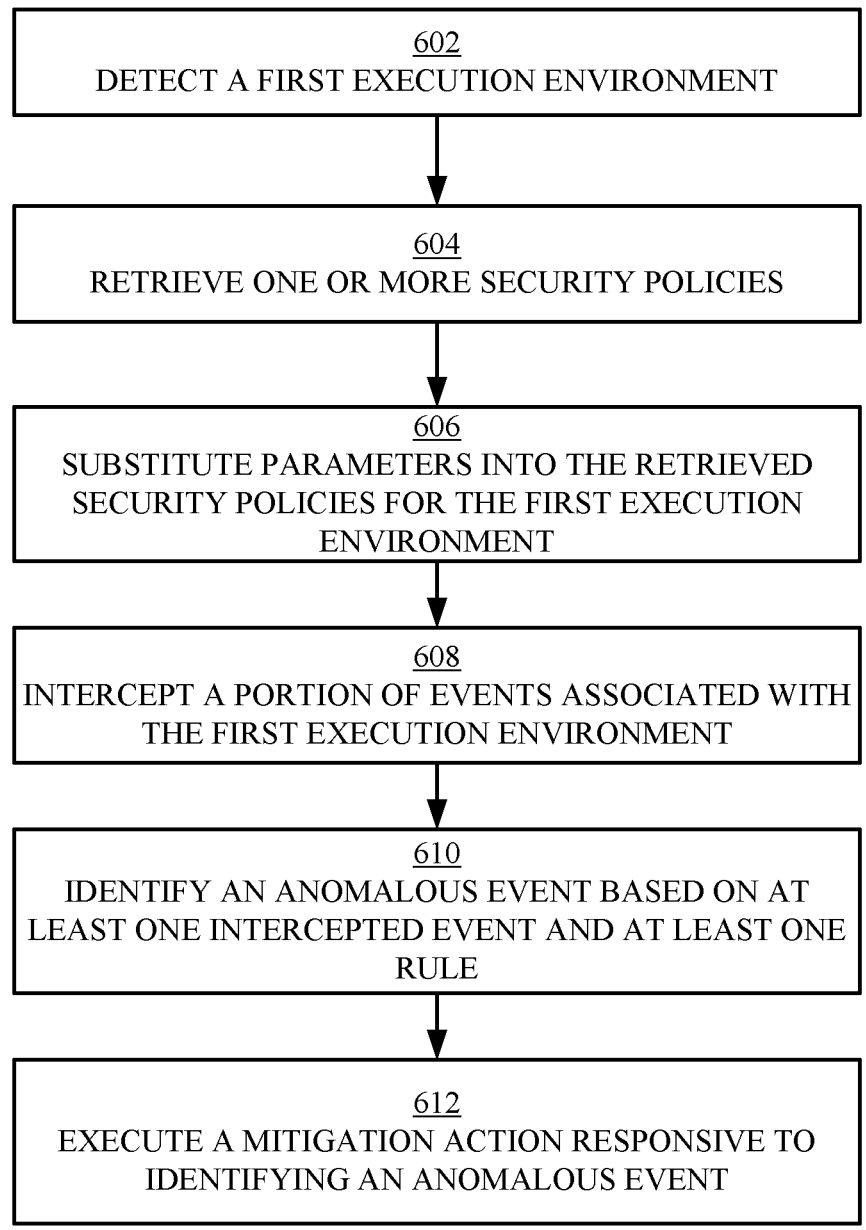
FIG. 6 illustrates a flowchart of an example method for enforcing a security policy in accordance with some embodiments of the present disclosure.

FIG. 6 illustrates a flowchart of an example method for enforcing a security policy in accordance with some embodiments of the present disclosure. In some embodiments, the method 600 can be executed by a security agent (e.g., security agent 114 of FIG. 1). In some embodiments, the method 600 is performed by executing instructions stored in a computer readable storage medium by a processor communicatively coupled to the computer readable storage medium.

In operation 602, the security agent detects a first execution environment. In some embodiments, operation 602 detects a first execution environment by intercepting one or more events associated with the first execution environment and identifying the first execution environment based on the intercepted events. In some embodiments, operation 602 extracts one or more universally unique identifiers (UUIDs) or globally unique identifiers (GUIDS) associated with the first execution environment in order to identify the first execution environment.

In operation 604, the security agent retrieves one or more security policies in response to detecting the first execution environment. In some embodiments, the one or more security policies are retrieved from a local storage. In some embodiments, the one or more security policies are retrieved from a security policy database.

In operation 606, the security agent can substitute one or more parameters into the retrieved security policies. Substituted parameters can be parameters retrieved from the first execution environment and associated with conditions of various rules (e.g., dynamic rules) associated with the retrieved security policies. Thus, in operation 606, the security agent, by substituting parameters from the first execution environment into one or more dynamic rules, transforms the dynamic rules to static rules able to be enforced in the first execution environment. For example, in an execution environment comprising a virtual machine instance, substitutable parameters can be related to resource locations (e.g., addresses) of various other hardware resources comprising the virtual machine.

In some embodiments, in operation 606 the security agent uses the parameters from the first execution environment to identify an appropriate path in a directed acyclic graph (DAG) of rules and/or security policies and enforces the rules and/or security policies from the identified appropriate path.

In operation 608, the security agent intercepts a first subset of events associated with the first execution environment. In some embodiments, the first subset of events are defined by the retrieved security policies. In some embodiments, the first subset of events can be events associated with a higher rate of malicious attack profiles than an average rate of all events generated by the execution environment. In some embodiments, the first subset of events can comprise less than 50%, 10%, or 1% of the total number of events generated by the first execution environment for a first time interval.

In operation 610, the security agent identifies an anomalous event based on at least one of the intercepted events and at least one rule of a retrieved security policy. In various embodiments, the intercepted event can be identified as an anomalous event based on the intercepted event satisfying all the conditions of a security rule (e.g., a permissive security rule generating a true value), or, in alternative embodiments, based on the intercepted event failing to satisfy one or more conditions of a security rule (e.g., a restrictive security rule generating a false value).

In operation 612, the security agent can execute a mitigation action responsive to identifying the anomalous event. The mitigation action can be, for example, generating an alert and communicating the alert to an administrator (e.g., a security manager). As another example, the mitigation action can be terminating a process associated with the anomalous event.

Figure 7:
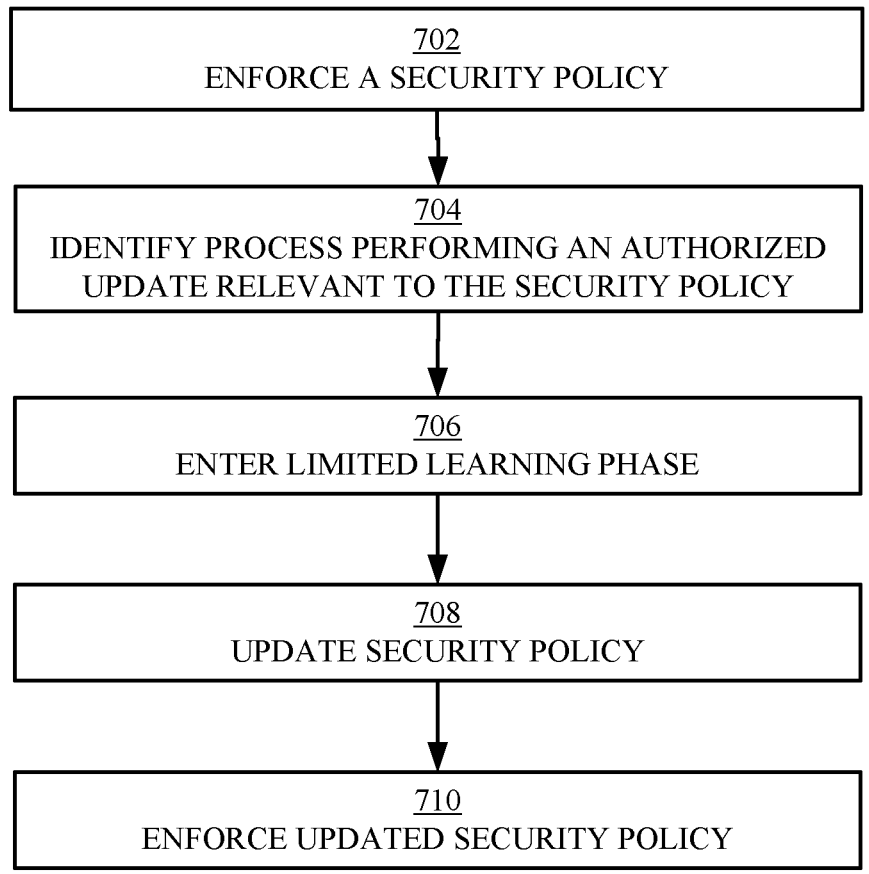
FIG. 7 illustrates a flowchart of an example method for updating a security policy in accordance with some embodiments of the present disclosure.

FIG. 7 illustrates a flowchart of an example method for updating a security policy in accordance with some embodiments of the present disclosure. In accordance with some embodiments, the method 700 can be executed by a security agent (e.g., security agent 114 of FIG. 1). In some embodiments, the method 700 is performed by executing instructions stored in a computer readable storage medium by a processor communicatively coupled to the computer readable storage medium.

In operation 702, the security agent enforces one or more security policies by intercepting certain events generated by one or more execution environments (e.g., as described with respect to operation 608 of FIG. 6).

In operation 704, the security agent identifies a process performing an authorized update relevant to an execution environment and/or a security policy. Operation 704 can identify an authorized service based on an executed tool or command, such as, but not limited to, Windows Update Service, an "apt-get" command (e.g., as used in Advanced Packaging Tool (APT) software packages), or a "yum" command (e.g., Yellowdog Updater Modifier as used in some Linux systems). For example, operation 704 can intercept an event and determine the event contains a command and/or other parameters indicating an authorized update process.

In operation 706, the security agent enters a limited learning phase. The limited learning phase can be configured to observe events generated by the execution environment associated with the authorized update for a certain time interval (e.g., 1 hour, 12 hours, 24 hours, 1 week, etc.). During the limited learning phase, the security agent can reduce or eliminate enforcement of the security policy or a subset of the security policy. In one example, the security agent does not enforce the security policy, or a subset of the security policy, for the duration of the limited learning phase. In another example, the security agent generates alerts triggered by identified anomalies but does not terminate any processes associated with the authorized update during the limited learning phase.

In operation 708, the security agent updates the security policy by updating any rules, conditions, and actions associated with the security policy and updated based on the limited learning phase. In some embodiments, operation 708 further comprises providing the updated security policy to a security manager. In operation 710, the security agent enforces the updated security policy.

Figure 8:
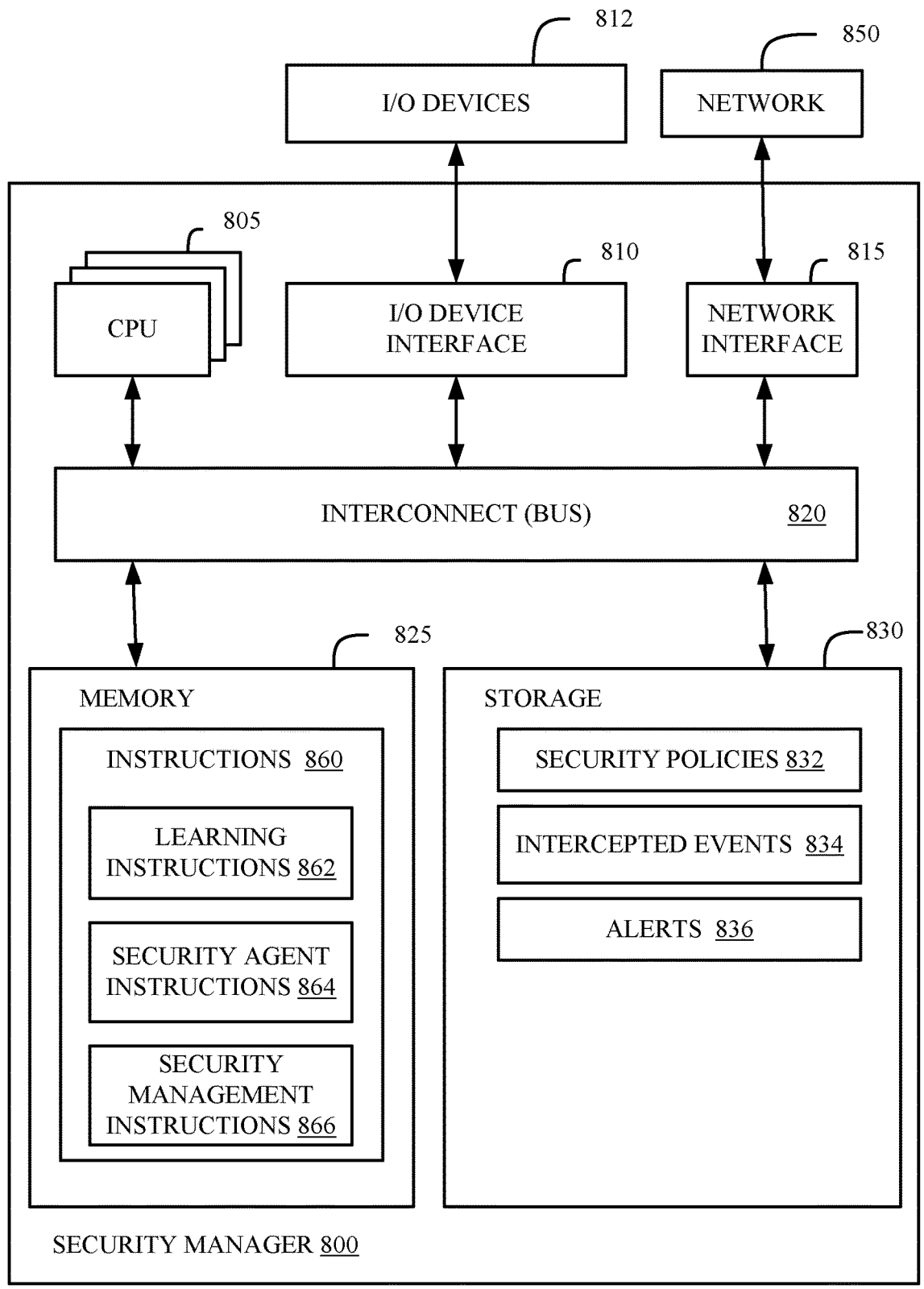
FIG. 8 illustrates a block diagram of a security manager in accordance with some embodiments of the present disclosure.

FIG. 8 illustrates a block diagram of a security manager 800 in accordance with some embodiments of the present disclosure. In some embodiments, security manager 800 is consistent with security manager 102 and/or security agent 114 of FIG. 1. Security manager 800 can interface with one or more client machines (e.g., nodes 106, 108, and 110 of FIG. 1) to provide, update, and manage security systems for the client machines. In various embodiments, security manager 800 can perform any of the methods described in FIGS. 4-7. In some embodiments, security manager 800 provides instructions for one or more of the methods described in FIGS. 4-7 to a client machine such that the client machine executes the method based on the instructions provided by the security manager 800. In some embodiments, security manager 800 also functions as a security agent (e.g., security agent 114 of FIG. 1) in situations where the security manager and security agent are stored in a same machine.

The security manager 800 can include a memory 825, storage 830, an interconnect (e.g., BUS) 820, one or more CPUs 805 (also referred to as processors 805 herein), an I/O device interface 810, I/O devices 812, and a network interface 815.

Each CPU 805 retrieves and executes programming instructions stored in the memory 825 or storage 830. The interconnect 820 is used to move data, such as programming instructions, between the CPUs 805, I/O device interface 810, storage 830, network interface 815, and memory 825. The interconnect 820 can be implemented using one or more busses. The CPUs 805 can be a single CPU, multiple CPUs, or a single CPU having multiple processing cores in various embodiments. In some embodiments, a CPU 805 can be a digital signal processor (DSP). Memory 825 is generally included to be representative of a random access memory (e.g., static random access memory (SRAM), dynamic random access memory (DRAM), or Flash). The storage 830 is generally included to be representative of a non-volatile memory, such as a hard disk drive, solid state device (SSD), removable memory cards, optical storage, or flash memory devices. In an alternative embodiment, the storage 830 can be replaced by storage area-network (SAN) devices, the cloud, or other devices connected to the security manager 800 via the I/O devices interface 810 or a network 850 via the network interface 815.

In some embodiments, the memory 825 stores instructions 860 and the storage 830 stores security policies 832, intercepted events 834, and alerts 836. However, in various embodiments, the instructions 860, the security policies 832, the intercepted events 834, and the alerts 836 are stored partially in memory 825 and partially in storage 830, or they are stored entirely in memory 825 or entirely in storage 830, or they are accessed over a network 850 via the network interface 815.

Security policies 832 can comprise one or more security policies stored in a security policy database. For example, security policies 832 can be consistent with security policy database 104 of FIG. 1 and/or security policy database 200 of FIG. 2. Security policies 832 comprise at least one security policy comprising at least one rule based on at least one condition. Security policies 832 can be provided to the security manager 800, or the security policies 832 can be learned based on execution of learning instructions 862 (e.g., as described with respect to FIG. 5).

Intercepted events 834 can comprise a subset of events generated by an execution environment and intercepted by a security agent enforcing a security policy for comparison to one or more rules of the security policy. In some embodiments, intercepted events 834 are consistent with events 118, 126, and/or 134 of FIG. 1.

Alerts 836 comprise alerts generated responsive to detecting anomalous behavior and provided to a user interface (e.g., I/O devices 812). Alerts 836 can comprise, among other information, a class of alert (e.g., emergency, critical, general, or informational), an identification of a client machine, node, and/or execution environment related to the alert, a name of a process associated with the alert, a name of a program generating the process associated with the alert, a time, and/or a recommended mitigation action.

The instructions 860 are processor executable instructions including learning instructions 862, security agent instructions 864, and security management instructions 866. Learning instructions 862 can be executed by security manager 800 to generate security policies 832 using a method such as the method 500 described with respect to FIG. 5.

Security agent instructions 864 can be configured to perform methods such as method 600 of FIG. 6 and method 700 of FIG. 7. In some embodiments, security agent instructions 864 are configured to compare intercepted events to one or more security policies and generate alerts indicating anomalous behavior according to the one or more security policies. In some embodiments, security agent instructions 864 are configured to send updated security policies, intercepted events, and/or alerts to security manager 800 for security manager 800 to store in security policies 832, intercepted events 834, and/or alerts 836. In some embodiments, security manager 800 functions as both security manager 800 and as a security agent and directly executes security agent instructions 864 rather than providing security agent instructions 864 to a client machine via the network 850.

Security management instructions 866 can be executed by security manager 800 to manage security for one or more communicatively coupled client machines or nodes using a method such as the method 400 described with respect to FIG. 4. In some embodiments, security manager 800 executes security management instructions 866 to manage security for security agents distributed to hundreds or thousands of client machines connected via network 850.

In various embodiments, the I/O devices 812 can include an interface capable of presenting information and receiving input. For example, I/O devices 812 can present information to a user (e.g., alerts 836) interacting with security manager 800 and receive input from a user (e.g., a selected mitigation action).

Security manager 800 is connected to the network 850 via the network interface 815. In some embodiments, network 850 is consistent with network 150 of FIG. 1.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
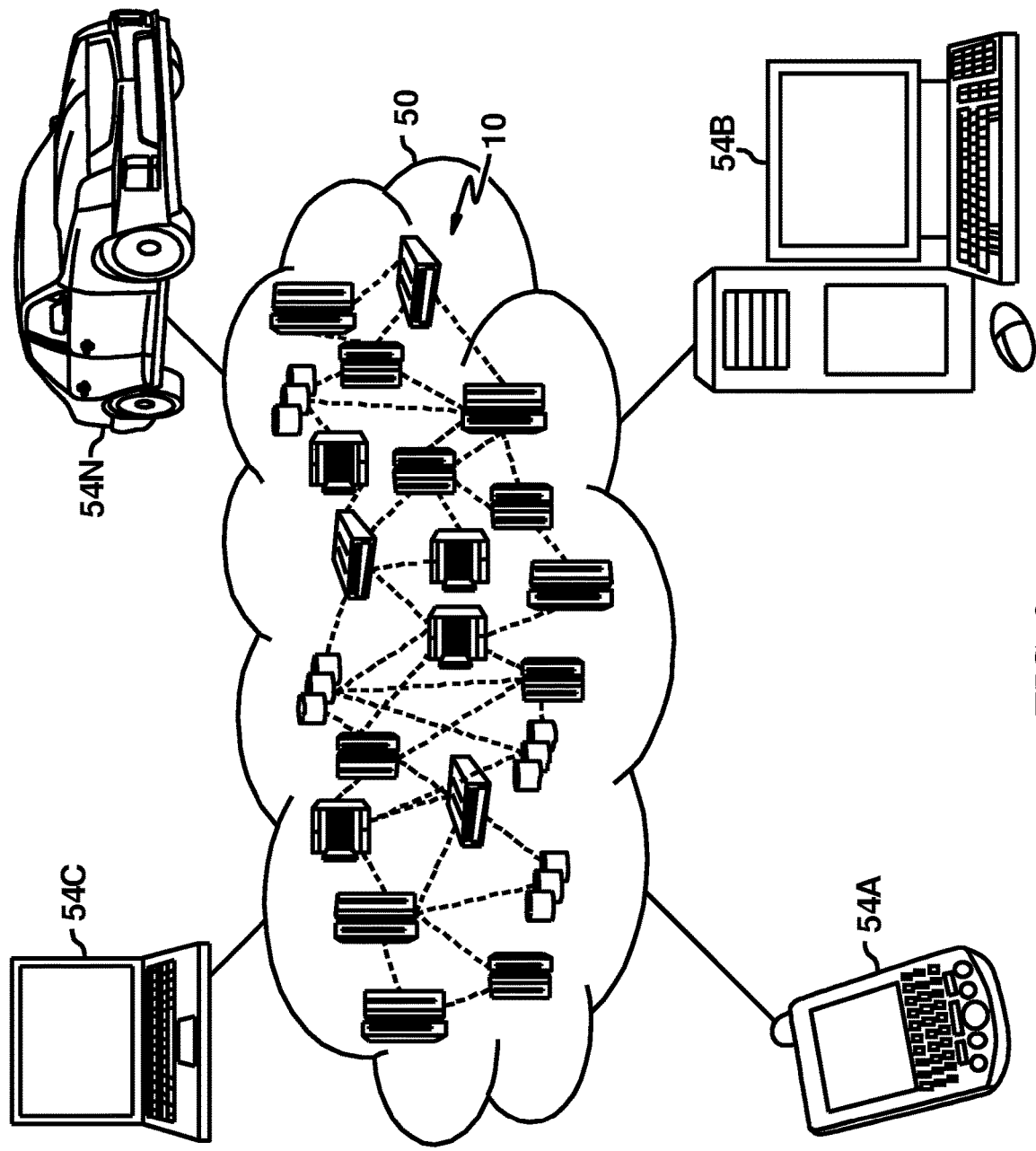
FIG. 9 depicts a cloud computing environment according to some embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
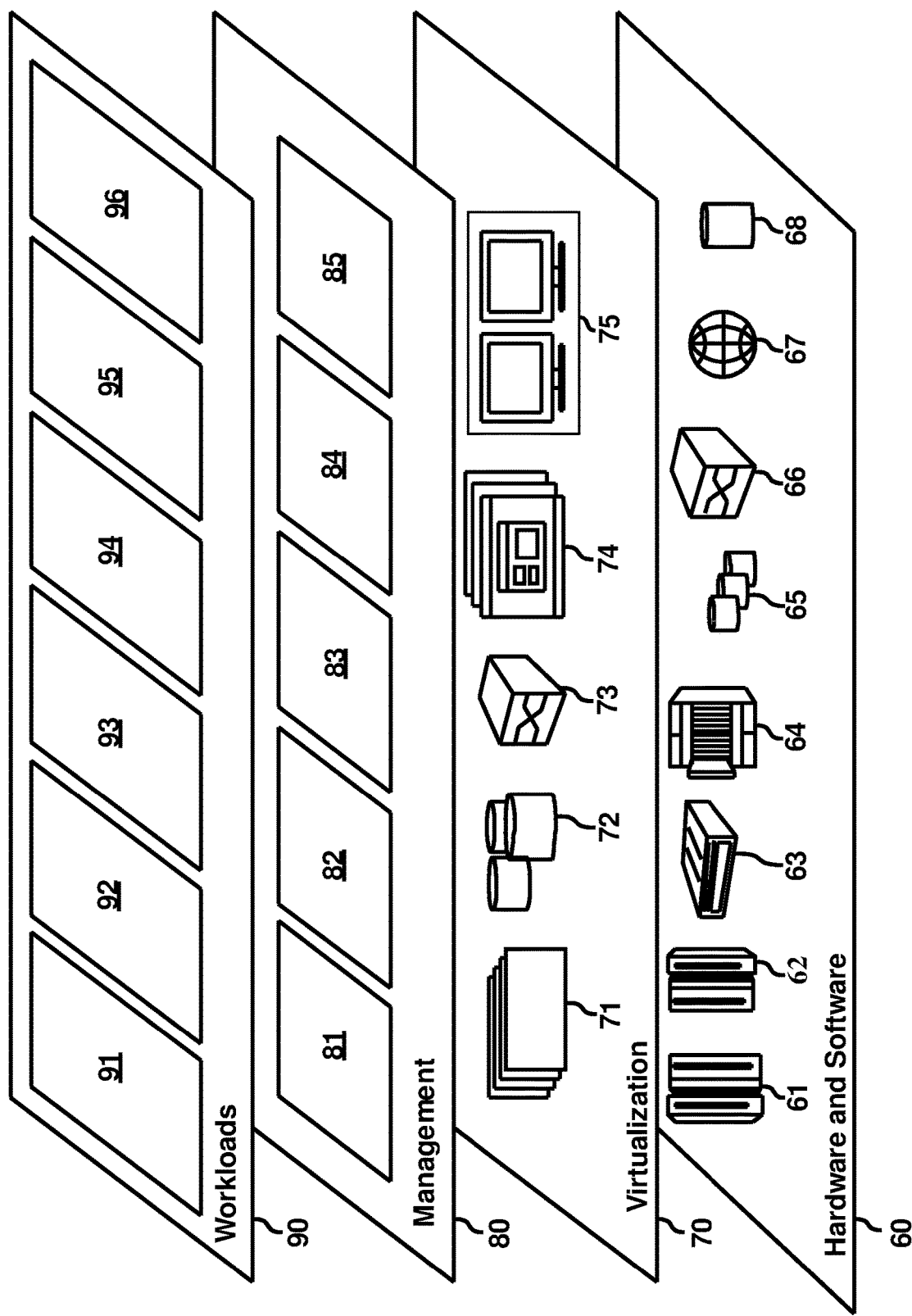
FIG. 10 depicts abstraction model layers according to some embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security management 96.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 860 of FIG. 8 and/or any software configured to perform any subset of the methods described with respect to FIGS. 4-7) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

What is claimed is:

1. A computer-implemented method comprising:
   intercepting, by a security agent of a client machine and based on a first learned security policy, a first subset of a plurality of events generated by a first execution environment utilizing the client machine, wherein the first learned security policy is learned based on observing operation of the first execution environment, wherein the first learned security policy is stored in a directed acyclic graph (DAG), and wherein at least one event of the first subset of events is a type of event associated with a malicious code profile;
   identifying, by the security agent and based on the first learned security policy for the first execution environment, an anomaly based on comparing at least one intercepted event to at least one rule of the first learned security policy; and
   executing, by the security agent, a mitigation action responsive to identifying the anomaly.

2. The method according to claim 1, further comprising:
   retrieving, by the security agent, the first learned security policy from a security policy database in response to identifying the first execution environment utilizing the client machine;
   wherein the security policy database comprises a plurality of learned security policies, wherein the first learned security policy comprises at least one security rule, and at least one condition.

3. The method according to claim 1, wherein the first learned security policy is learned by intercepting a subset of simulated events generated by a simulation of the first execution environment and generating a plurality of rules based on the intercepted subset of simulated events.

4. The method according to claim 1, wherein the first subset comprises less than 1% of the plurality of events.

5. The method according claim 1, wherein the method is performed by the security agent according to instructions downloaded to the client machine from a remote data processing system.

6. The method according to claim 1, wherein the first learned security policy comprises at least one static rule independent of the first execution environment and at least one dynamic rule dependent on at least one parameter configured in the first execution environment, wherein the method further comprises:
   substituting at least one parameter configured in the first execution environment in the at least one dynamic rule of the first learned security policy.

7. The method according to claim 1, wherein identifying the anomaly further comprises:
   comparing a plurality of conditions for a first rule of the first learned security policy and the at least one intercepted event, wherein the plurality of conditions are related to a process name, a command line, and a file digest for the at least one intercepted event.

8. The method according to claim 1, wherein the at least one rule in the first learned security policy is associated with a set of conditions configured to generate a true value or a false value, wherein the true value is configured to execute the mitigation action, wherein the false value is configured to iterate to a next intercepted event.

9. The method according to claim 1, wherein the at least one rule in the first learned security policy is associated with a set of conditions configured to generate a true value or a false value, wherein the false value is configured to execute the mitigation action, wherein the true value is configured to iterate to a next intercepted event.

10. The method according to claim 1, wherein a majority of respective events of the first subset of events comprise events associated with more than one malicious code profile.

11. The method according to claim 2, wherein the security policy database comprises a security rules table, a security policies table, and a client machines table, wherein multiple security rules are associated with at least one security policy, wherein multiple security policies are associated with at least one security rule, wherein multiple client machines are associated with at least one security policy, and wherein multiple security policies are associated with at least one client machine.

12. The method according to claim 3, wherein the first subset comprises less than half of the plurality of events.

13. The method according to claim 5, wherein the method further comprises:
   metering usage of the security agent; and generating an invoice based on metering the usage of the security agent.

14. The method according to claim 5, further comprising:
identifying a process performing an authorized update on the first execution environment;
entering a limited learning phase, wherein, during the limited learning phase, the method further comprises:
intercepting a new set of events generated by the updated first execution environment;
generating an updated first learned security policy by updating at least one rule of the first learned security policy based on the new set of events; and
providing the updated first learned security policy to the remote data processing system.

15. The method according to claim 11, further comprising:
retrieving, by the security agent, at least a second learned security policy from the security policy database in response to determining that the client machine is associated with the first learned security policy and the second learned security policy in the security policy database.

16. A computer system comprising:
one or more processors;
one or more computer-readable storage media collectively storing program instructions which, when executed by the one or more processors, perform the steps of:
intercepting, based on a first learned security policy, a first subset of a plurality of events generated by a first execution environment utilizing a client machine, wherein the first learned security policy is learned based on observing operation of the first execution environment, wherein the first learned security policy is stored in a directed acyclic graph (DAG), wherein at least one event of the first subset of events is a type of event associated with a malicious code profile;
identifying, based on the first learned security policy for the first execution environment, an anomaly based on comparing at least one intercepted event to at least one rule of the first learned security policy; and
executing a mitigation action responsive to identifying the anomaly.

17. A computer program product comprising one or more computer readable storage media having program instructions collectively embodied therewith, the program instructions executable by one or more processors to cause the one or more processors to perform a method comprising:
intercepting, based on a first learned security policy, a first subset of a plurality of events generated by a first execution environment utilizing a client machine, wherein the first learned security policy is learned based on observing operation of the first execution environment, wherein the first learned security policy is stored in a directed acyclic graph (DAG), and wherein at least one event of the first subset of events is a type of event associated with a malicious code profile;
identifying, based on the first learned security policy for the first execution environment, an anomaly based on comparing at least one intercepted event to at least one rule of the first learned security policy; and
executing a mitigation action responsive to identifying the anomaly.

18. A computer-implemented method comprising:
generating a first learned security policy based on a subset of events associated with a synthetic first execution environment, wherein at least one rule associated with the first learned security policy is based on a type of event that is associated with a malicious code profile;
storing the first learned security policy in a directed acyclic graph (DAG) in a security policy database;
providing the first learned security policy to a first client, wherein the first learned security policy is relevant to a first execution environment deployed by the first client; and
receiving, from the first client, an alert identifying an anomaly based on at least one intercepted event generated by the first execution environment deployed on the first client and intercepted by the first client according to the first learned security policy.

19. The method according to claim 18, wherein the DAG includes security policies comprising rules represented as nodes, and connections between the security policies represented as edges.

20. The method according to claim 18, wherein generating the first learned security policy further comprises:
intercepting a first subset of events from the synthetic first execution environment for a first time interval;
generating a plurality of rules defining normal and abnormal behavior based on the first subset of events from the synthetic first execution environment, wherein respective rules are associated with one or more conditions;
storing the plurality of rules as the first learned security policy for the first execution environment in the security policy database; and
associating the first learned security policy with the first client.

21. The method according to claim 18, wherein the first learned security policy is configured to be dynamically changed by the first client based on respective parameters associated with the first execution environment deployed on the first client.

22. The method according to claim 20, wherein providing the first learned security policy further comprises:
providing a second learned security policy responsive to determining that a second node corresponding to the second learned security policy shares an edge in the DAG with a first node corresponding to the first learned security policy.

23. A computer-implemented method comprising:
generating a first learned security policy based on a subset of events associated with a synthetic first execution environment, wherein at least one rule associated with the first learned security policy is based on a type of event that is associated with a malicious code profile;
storing the first learned security policy in a security policy database;
providing the first learned security policy to a first client, wherein the first learned security policy is relevant to a first execution environment deployed by the first client; and
receiving, from the first client, an alert identifying an anomaly based on at least one intercepted event generated by the first execution environment deployed on the first client and intercepted by the first client according to the first learned security policy.

24. The method according to claim 23, wherein the security policy database comprises a plurality of learned security policies, wherein the first learned security policy comprises at least one security rule, and at least one condition.

25. The method according to claim 23, wherein the security policy database comprises a security rules table, a security policies table, and a clients table, wherein multiple security rules are associated with at least one security policy, wherein multiple security policies are associated with at least one security rule, wherein multiple clients are associated with at least one security policy, and wherein multiple security policies are associated with at least one client.

* * * * *